(No Model.)
M. R. JENKINS.
HAY FORK.
No. 348,744. Patented Sept. 7, 1886.
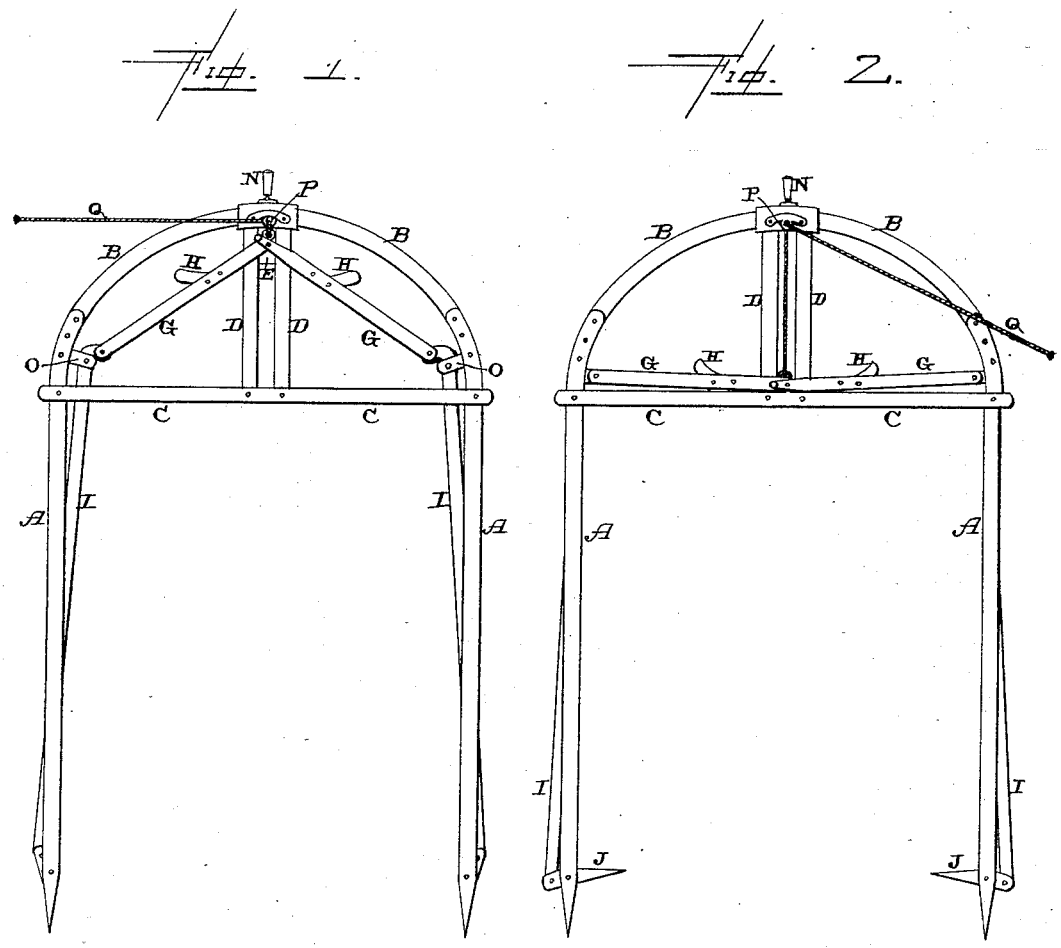
Witnesses.
R. F. Gardner
A. S. Pattison
Inventor.
M. R. Jenkins,
per F. A. Lehmann,
Atty.

United States Patent Office.

MONROE R. JENKINS, OF RED CREEK, NEW YORK.

HAY-FORK.

SPECIFICATION forming part of Letters Patent No. 348,744, dated September 7, 1886.

Application filed May 6, 1886. Serial No. 201,305. (No model.)

*To all whom it may concern:*

Be it known that I, MONROE R. JENKINS, of Red Creek, in the county of Wayne and State of New York, have invented certain new and useful Improvements in Hay-Forks; and I do hereby declare the following to be a full, clear, and exact description of the invention, such as will enable others skilled in the art to which it pertains to make and use it, reference being had to the accompanying drawings, which form part of this specification.

My invention relates to an improvement in hay-forks; and it consists in the combination of the frame of the fork provided with a vertical guide in its upper portion, a slide which moves in the guide, two connecting-rods, which are connected at their inner ends to the slide, the pivoted supporting-pieces, to which are connected the operating-rods of the tines, and which rods are connected at their upper ends to the connecting-rods, all of which will be more fully described hereinafter.

The object of my invention is to connect the two tines of the fork together so that they can be operated simultaneously, in contradistinction to having each one provided with a lever which has to be operated by itself.

Figures 1 and 2 are side elevations of a fork embodying my invention, showing the operating parts in different positions.

A represents the frame of the fork; B, the arch or top piece, and C the cross-piece. The arch B and cross-piece C are connected together at their centers by the guides, in between which the slide E has a vertical movement. Connected to this slide E at their inner ends are the two connecting-rods G, which are provided with the foot-pieces H. The outer ends of these connecting-rods G are pivoted to the upper bent ends of the rods I, which extend down and are connected to the tines J in the usual manner. The rods I are pivoted near their upper ends to the pivoted swinging supports O, which are connected at their outer ends to the frame A.

Upon the top of the arch B is formed the handle N, by means of which the fork is adjusted in position to be forced into the hay, and by means of which the operator can hold on while he is forcing the tines J into the position shown in Fig. 2 by standing upon the foot-pieces H.

Upon one side of the arch B is connected a ring, P, through which passes the trip-rope Q. The inner end of this trip-rope is connected to the top of the slide E, for the purpose of pulling the slide from the position shown in Fig. 2 upward into the position shown in Fig. 1.

The fork is placed in the proper position over the hay which is to be elevated, and then the operator forces the fork down into the hay by means of his hands, and then steps upon the foot-pieces H, so as to force the fork down into the hay as far as it will go. At the same time the frame A is forced down into the hay, the slide E is forced downward into the position shown in Fig. 2, thereby causing the rods G to assume an almost horizontal position at the same time that they force the rods I outward and downward at their upper ends, so as to operate the tines J at their lower ends. After the load of hay has been carried to any desired point, and it is desired to discharge the load, the trip-rope Q is pulled and the slide E is raised up past the center, when the weight of the load moves the other parts, so as to depress the inner ends of the tines and cause them to release their hold upon the hay. It will be seen that both tines are operated at the same time and by a single pull upon the trip-rope Q, which causes both tines to move in the same direction. The guide serves to brace and steady the movement of the rods G, and thus the levers are never liable to be bent out of position or become disarranged in any manner. When the hay is close under the track, the fork can be pulled back without sticking into the hay and dragging it back, as the old-style fork will do, the trip-rope being fast to the top, instead of coming out from under a low cross-piece. If a ring is used for the trip-rope to pass through, it should be large enough to not cut the rope. If a malleable head and eye are used, it should have this ring cast on one side.

The fork has no exposed parts when loaded or tripped. The quickness with which it can be set, as well as the convenience of setting it with the foot, are great considerations in favor of the construction here shown.

Having thus described my invention, I claim—

1. In a hay-fork, the combination of the frame A, the guides D, the slide E, the connecting-rods G, pivoted supports O, the rods I, the tines J, and the trip-rope, substantially as described.

2. In a hay-fork, the combination of the frame A, the guides D, the slide E, the rods G, connected to the slide and provided with the foot-pieces H, supports O, rods I, the tines J, and the trip-rope, substantially as set forth.

In testimony whereof I affix my signature in presence of two witnesses.

MONROE R. JENKINS.

Witnesses:
G. M. COPLIN,
C. O. PETERSON.